United States Patent
Roesel et al.

(10) Patent No.: US 12,422,029 B2
(45) Date of Patent: Sep. 23, 2025

(54) BEARING UNIT AND ACTUATING DRIVE

(71) Applicant: OECHSLER AG, Ansbach (DE)

(72) Inventors: Andreas Roesel, Nuremberg (DE); Stefan Dettenberger, Ansbach (DE)

(73) Assignee: OECHSLER AG, Ansbach (DE)

( * ) Notice: Subject to any disclaimer, the term of this patent is extended or adjusted under 35 U.S.C. 154(b) by 0 days.

(21) Appl. No.: 18/795,545

(22) Filed: Aug. 6, 2024

(65) Prior Publication Data
US 2025/0052305 A1    Feb. 13, 2025

(30) Foreign Application Priority Data
Aug. 8, 2023 (DE) .................... 10 2023 121 042.4

(51) Int. Cl.
| | |
|---|---|
| *F16H 57/021* | (2012.01) |
| *F16H 37/04* | (2006.01) |
| *F16H 57/023* | (2012.01) |
| *F16H 57/08* | (2006.01) |
| F16H 57/02 | (2012.01) |

(52) U.S. Cl.
CPC ......... *F16H 37/041* (2013.01); *F16H 57/021* (2013.01); *F16H 2057/02034* (2013.01)

(58) Field of Classification Search
CPC ................. F16H 37/041; F16H 57/021; F16H 2057/02034
See application file for complete search history.

(56) References Cited

U.S. PATENT DOCUMENTS

| | | | |
|---|---|---|---|
| 8,790,208 B2 | 7/2014 | Poertzgen et al. | |
| 9,163,700 B2 | 10/2015 | Schneider | |
| 10,106,132 B2 | 10/2018 | Takeo | |
| 2013/0203554 A1* | 8/2013 | Dettenberger ............ | F16H 1/28 475/343 |
| 2015/0210253 A1* | 7/2015 | Qi .......................... | B60T 7/085 188/162 |
| 2020/0223417 A1 | 7/2020 | Otto et al. | |
| 2021/0362700 A1 | 11/2021 | Schwarz et al. | |

FOREIGN PATENT DOCUMENTS

| | | | |
|---|---|---|---|
| DE | 29814294 U1 | 11/1998 | |
| DE | 102005036863 A1 * | 2/2007 | ............ B60T 13/741 |
| DE | 102014214743 A1 | 1/2016 | |
| DE | 102016223358 A1 | 5/2018 | |

(Continued)

OTHER PUBLICATIONS

Machine translation for IDS cited art DE 102014214743A1, pp. 1-7 (Year: 2024).*

(Continued)

*Primary Examiner* — Tisha D Lewis
(74) *Attorney, Agent, or Firm* — Dority & Manning, P.A.

(57) ABSTRACT

In one aspect, a bearing unit for a motor and at least one gear element of an actuating drive includes at least one fixing element with which the motor is fixable and/or mountable in a housing of the actuating drive. The bearing unit also includes at least one ring gear having at least one securing section, the at least one ring gear being fixable and/or non-rotatably mountable in the housing via the at least one securing section. Additionally, the bearing unit includes at least one bearing axle that connects the at least one ring gear and the at least one fixing element.

18 Claims, 2 Drawing Sheets

(56) References Cited

FOREIGN PATENT DOCUMENTS

| | | |
|---|---|---|
| DE | 102019131607 A1 | 5/2021 |
| EP | 4019798 A1 | 6/2022 |
| WO | WO-2016004794 A1 * | 1/2016 .............. B60T 13/74 |

OTHER PUBLICATIONS

German Search Report for corresponding Application No. DE 10 2023 121 042.4, issued Apr. 16, 2024, 8 pages.
Extended European Search Report for corresponding Application No. EP 24192371.3, dated Jan. 2, 2025, 8 pages.

* cited by examiner

BEARING UNIT AND ACTUATING DRIVE

CROSS-REFERENCE TO RELATED APPLICATIONS

The present application is based upon and claims the right of priority to German Patent Application No. 10 2023 121 042.4, filed Aug. 8, 2023, the disclosure of which is hereby incorporated by reference herein in its entirety for all purposes.

FIELD OF THE INVENTION

The present subject matter relates to a bearing unit for a motor and/or at least one gear element of an actuating drive, having at least one fixing element, by means of which the motor is fixable and/or mountable in a housing of the actuating drive, and having at least one ring gear, by means of which the at least one gear element of the actuating drive is accommodatable and/or mountable, wherein the at least one ring gear includes at least one securing section, by means of which the ring gear is fixable and/or non-rotatably mountable in the housing. The subject matters also relates to an actuating drive, in particular for a vehicle component, for example, for an electronic parking brake.

BACKGROUND OF THE INVENTION

DE 10 2019 131 607 A1 describes an assembly, in particular for a parking brake actuator. The parking brake actuator includes a housing in which an electric motor and a gear train, which is drivable by the electric motor, are arranged. A ring gear has at least one supporting device for providing support in a housing. The electric motor is accommodated at a first axial end in a fixing plate. An additional supporting plate accommodates an exchangeable counter wheel of the gear train, and the fixing plate of the electric motor is supported on the supporting plate. Due to this arrangement, undesirable movements of the gear train components can arise, as a result of which component wear is increased. As a result, the likelihood of failure of the actuating drive, or of the parking brake actuator, is increased. In addition, the increased wear can increase the tooth engagement of the gear train components, as a result of which interfering noises, or increased operational noise, can arise.

Generally, a need exists for a bearing unit and an actuating drive that eliminates the disadvantages known from the prior art.

SUMMARY OF THE INVENTION

In various aspects, the present subject matter is directed to a bearing unit and an actuating drive having the features described and claimed herein.

In one aspect, the present subject matter relates to a bearing unit for a motor and/or at least one gear element of an actuating drive. The motor is preferably an electric motor. The at least one gear element is preferably a gear wheel, in particular a planetary gear unit and/or a transmission gearing, of the actuating drive. The gear element can be, for example, at least one input pinion, at least one transmission gear, at least one transmission pinion, at least one intermediate pinion, at least one output gear, at least one sun gear, at least one planet carrier and/or at least one planet gear.

The bearing unit includes at least one fixing element, by means of which the motor is fixable and/or mountable in a housing of the actuating drive. In addition, the bearing unit includes at least one ring gear. By means of the ring gear, the at least one gear element of the actuating drive, in particular of a planetary gear unit and/or of a transmission gearing of the actuating drive, is accommodatable and/or mountable. The bearing unit therefore includes the at least one fixing element and the at least one ring gear. The fixing element can be, for example, a fixing plate. It is also conceivable that the bearing unit includes two ring gears, which form a ring gear unit.

The at least one ring gear supports and/or accommodates at least one gear element when the actuating drive is used as intended. In this way, the at least one output gear, the at least one sun gear, the at least one planet carrier and/or the at least one planet gear can be accommodated and/or arranged within the ring gear. The at least one ring gear, the at least one output gear, the at least one sun gear, the at least one planet carrier and/or the at least one planet gear preferably form the planetary gear unit.

The at least one input pinion, the at least one transmission gear, the at least one transmission pinion and/or the at least one intermediate pinion are/is preferably supported on the at least one ring gear and/or on the at least one fixing element. The at least one input pinion, the at least one transmission gear, the at least one transmission pinion and/or the at least one intermediate pinion preferably form the transmission gearing. The at least one input pinion, the at least one transmission gear, the at least one transmission pinion and/or the at least one intermediate pinion are/is preferably supported by means of the fixing element and/or the ring gear.

The at least one ring gear includes at least one securing section, by means of which the ring gear is fixable and/or non-rotatably mountable in the housing. The securing section is preferably cam-shaped and/or toothed. The cam-shaped securing section has a plurality of cams which, on an outer side of the ring gear, extend radially outward away from the ring gear. For example, the cams can have a basic cuboid shape. By means of at least one supporting section of the housing, which corresponds with the securing section, the at least one ring gear is fixed, or non-rotatably mounted and/or accommodated, in the actuating drive when the bearing unit is used as intended. The supporting section can therefore include a plurality of receiving pockets, which correspond with the cams. Preferably, the at least one ring gear can be separated from the housing along an axial direction of the actuating drive, or of the motor.

According to the present subject matter, the bearing unit has at least one bearing axle, with the at least one ring gear and the at least one fixing element being connected, in particular directly connected, via the at least one bearing axle when the bearing unit is used as intended. The at least one bearing axle therefore provides the connection between the at least one ring gear and the at least one fixing element. As a result, the tolerances between the individual gear elements of the actuating drive, in particular of the transmission gearing and/or of the planetary gear unit, can be held as low as possible.

Preferably, the at least one ring gear and the at least one fixing element are separably connected to one another via the at least one bearing axle. In this way, for example, the at least one ring gear and/or the at least one fixing element can be replaced. This is advantageous, in particular, to allow for simpler adaptability of the actuating drive to various performance and size classes. In addition, as a result, the at least one ring gear and/or the at least one fixing element and/or the at least one gear element can be very easily replaced (e.g., in the event of wear).

Additionally or alternatively, the at least one bearing axle can support and/or accommodate at least one gear element, in particular a transmission pinion and/or an intermediate pinion. In this way, the at least one ring gear, the at least one fixing element and the at least one gear element are supported, in particular directly supported, on the at least one bearing axle. As a result, the tolerances and/or the tolerance chains can be held as low as possible.

The bearing unit is preferably formed of multiple pieces, in particular of at least two pieces. Due to the two-piece design of the bearing unit, the at least one fixing element and the at least one ring gear can have materials which differ from one another. Therefore, the optimal material can be used according to the requirement for each particular component. Preferably, the fixing element has a first material, in particular plastic, and the at least one ring gear has a second material, in particular metal. Additionally or alternatively, the at least one ring gear has a sintered metal, in particular aluminum.

Additionally or alternatively, the at least one ring gear is stamped out of a metal sheet as a stamped part, in particular as a fine stamped part, a fine blanked part and/or a precision stamped part.

It is advantageous when the at least one ring gear includes the at least one bearing axle and/or at least one receiving cavity for the at least one bearing axle, and/or the at least one fixing element includes the at least one bearing axle and/or at least one bearing through-hole for the at least one bearing axle. In this way, the at least one ring gear and the at least one fixing element can be connected to each other, in particular directly connected to each other, by means of the at least one bearing axle, the at least one receiving cavity and/or the at least one bearing through-hole when the bearing unit is used as intended.

Furthermore, it is advantageous when the at least one bearing axle is preferably accommodated in the at least one receiving cavity of the at least one ring gear, in particular in a non-displaceable and/or removable manner, and/or is mounted in the at least one bearing through-hole in the fixing element when the bearing unit is used as intended.

It is also advantageous when the at least one bearing axle is in the form of an independent bearing pin and/or extends along an axial direction of the actuating drive.

Furthermore, it is advantageous when the at least one bearing axle supports and/or accommodates the at least one gear element and/or at least one gear component of the actuating drive, in particular of a transmission gearing of the actuating drive.

It is also advantageous when the at least one ring gear has at least two, preferably at least three, bearing axles and/or at least two, preferably at least three, receiving cavities.

It is advantageous when the at least one fixing element has at least two, preferably at least three, bearing through-holes.

It is also advantageous when a first bearing axle supports and/or accommodates at least one transmission gear and/or at least one transmission pinion, a second bearing axle supports and/or accommodates at least one first intermediate pinion and/or a third bearing axle supports and/or accommodates at least one second intermediate pinion. Preferably, the first bearing axle, the second bearing axle and/or the third bearing axle are/is connected, in particular non-displaceably connected, to the at least one ring gear and/or secured to the at least one ring gear.

The at least one transmission gear and the at least one transmission pinion are preferably in the form of a double gear and/or are connected to each other, in particular in a non-displaceable manner. The double gear is preferably supported and/or accommodated on the first bearing axle.

The input pinion is preferably mounted on the motor and rotates about an input axis. The motor is fixed in turn by means of the bearing unit. The at least one ring gear preferably accommodates the gear elements of the planetary gear unit. Therefore, an output axis of the planetary gear unit is also fixed by means of the bearing unit. Due to the fact that the at least one bearing axle, preferably the first bearing axle, the second bearing axle and/or the third bearing axle, are/is also determined, or fixed, by means of the at least one ring gear and thus by means of the bearing unit, the distances between the gear elements of the planetary gear unit and of the transmission gearing can be held constant with respect to one another.

Moreover, it is advantageous when the at least one ring gear has a first receiving cavity for the first bearing axle, a second receiving cavity for the second bearing axle and/or a third receiving cavity for the third bearing axle, and/or the fixing element has a first bearing through-hole for the first bearing axle, a second bearing through-hole for the second bearing axle and/or a third bearing through-hole for the third bearing axle.

It is also advantageous when the transmission pinion is in engagement with the first intermediate pinion and/or with the second intermediate pinion when the actuating drive is used as intended.

It is also advantageous when the first bearing axle is arranged between the second bearing axle and the third bearing axle, the first receiving cavity is arranged between the second receiving cavity and the third receiving cavity and/or the first bearing through-hole is arranged between the second bearing through-hole and the third bearing through-hole.

Furthermore, it is advantageous when the first bearing through-hole together with the first bearing axle forms an interference fit and/or a transition fit. Additionally or alternatively, the first bearing through-hole rests circumferentially against the first bearing axle. As a result, a first center distance between an input axis of the motor and a transmission axis extending through the first bearing axle and/or a second center distance between the transmission axis and an output axis of the planetary gear unit are/is designed to be constant and/or invariable when the bearing unit is used as intended.

It is also advantageous when at least one compensating play or tolerance is formed between at least one of the bearing through-holes and at least one of the bearing axles, so that the at least one fixing element is movable, in particular in a limited manner, with respect to the at least one ring gear when the actuating drive is used as intended.

Preferably, the compensating play or tolerance includes spacing between at least one of the bearing through-holes and at least one of the bearing axles. By means of the spacing, the limited movability of the at least one fixing element with respect to the at least one bearing axle can be very easily ensured. Additionally or alternatively, it is conceivable that at least one compensating element is arranged at least in part within the compensating play or tolerance, or in the region of the spacing. In one embodiment, the compensating element is at least partially deformable. For example, the compensating element is made of a moldable third material, in particular of foamed plastic, plastic, adhesive, elastomer and/or rubber.

It is also advantageous when a first compensating play or tolerance is formed between the second bearing through-hole and the second bearing axle, and/or a second compensating play or tolerance is formed between the third bearing through-hole and the third bearing axle, so that, when the actuating drive is used as intended, the at least one fixing element is pivotable in a limited manner with respect to the at least one ring gear, in particular about the first bearing axle and/or about the transmission axis. Since preferably the first bearing axle rests against the first bearing through-hole, only a rotational motion, or the pivoting motion, is achievable about the first bearing axle. In this way, it can be ensured that the intermediate pinion, which is arranged on the second bearing axle and/or on the third bearing axle, is/are pivoted only in a limited manner. In this way, for example, forces and/or torques that are introduced by the motor and/or the output axis onto one of the gear elements and/or the bearing unit can be compensated for merely by means of the limited pivoting motion. The limited pivoting therefore compensates for the acting forces and/or torques. During pivoting, in addition, the two intermediate pinions can be pressed against the at least one output gear with different amounts of force. Due to the power-splitting onto these two intermediate pinions, the engagement between at least one of the two intermediate pinions and the output gear is always ensured.

It is also advantageous when the at least one receiving cavity of the at least one ring gear has at least one receiving opening and/or the at least one receiving cavity is formed as a receiving through-hole with two receiving openings which are spaced apart from one another along the axial direction of the actuating drive.

It is also advantageous when the at least one bearing axle has a receiving section and/or a bearing section, wherein, when the bearing unit is used as intended, the receiving section is preferably at least partially accommodated and/or arranged in the receiving cavity of the at least one ring gear and/or in the bearing through-hole in the fixing element, and/or the at least one gear element and/or gear unit component of the actuating drive, in particular of the transmission gearing of the actuating drive, is supported and/or accommodated on the bearing section. Preferably, the at least one bearing axle, in particular the first bearing axle, the second bearing axle and/or the third bearing axle, are/is supported and/or secured, for example, exclusively, at one end on the at least one ring gear. In this way, tolerances of other surrounding components can be disregarded. Due to the mounting, or securing, of the at least one bearing axle on only one component, or component unit, i.e., the at least one ring gear and/or the ring gear unit, it can be ensured that the axial distances between the gear elements are maintained.

In addition, it is advantageous when the receiving section extends over at least one-third, preferably at least one-half, of an overall length of the bearing axle extending along the axial direction.

It is also advantageous when the receiving section, together with the bearing section, extends over at least one-half, preferably at least two-thirds, of the overall length of the bearing axle extending along the axial direction.

Furthermore, it is advantageous when the at least one bearing axle has a first end, which is adjacent to the bearing section, and/or a second end, which is adjacent to the receiving section.

It is also advantageous when the second end of the at least one bearing axle is arranged within the receiving cavity and/or when the at least one ring gear projects at least in part above the at least one bearing axle counter to the axial direction. The axial direction extends from a housing bottom section to a housing cover of the actuating drive, or from the at least one ring gear to the at least one output gear of the planetary gear unit. The at least one bearing axle also projects from the at least one ring gear in the axial direction.

It is also advantageous when the first end of the at least one bearing axle is arranged within the at least one gear element and/or the gear element projects at least in part above the at least one bearing axle in the axial direction.

The present subject matter also relates to an actuating drive, in particular for a vehicle component, for example, for an electronic parking brake. The actuating drive includes at least one housing, a motor which is arranged in the housing, at least one planetary gear unit and/or transmission gearing which are/is arranged in the housing and are/is coupled to the motor, at least one bearing unit for the motor, and at least one gear element of the planetary gear unit and/or transmission gearing.

According to aspects of the present subject matter, the at least one bearing unit of the actuating drive is designed according to the preceding description, wherein the aforementioned features can be present individually or in any combination.

It is advantageous when a first end and/or a second end of the at least one bearing axle are/is spaced apart from the housing, in particular from a housing bottom part and/or a housing cover, of the actuating drive when the bearing unit and/or the actuating drive are/is used as intended.

The at least one bearing axle is supported and/or accommodated preferably exclusively in the bearing unit. Preferably, the at least one bearing axle, in particular the first bearing axle, the second bearing axle and/or the third bearing axle, are/is supported and/or accommodated exclusively at one end on the bearing unit. In order to be accommodated in the bearing unit, the at least one bearing axle can have a receiving section.

It is also advantageous when the at least one gear element and/or the at least one ring gear are/is in the form of a stamped part, in particular a fine stamped part, a fine blanked part and/or a precision stamped part. Fine stamping, or fine blanking, is a non-cutting separation method in which highly precise workpieces, specifically the gear element in the present case, can be produced. Additionally or alternatively, the gear element can be simultaneously shaped. In contrast to "normal" stamping, the at least one gear element is held at the cut contour, in particular at least an outer contour and/or inner contour, preferably using a knife-edged ring, during stamping and/or shaping by means of fine stamping, fine blanking and/or precision stamping. Once the gear element is held, a punch cuts the at least one gear element out of the metal. As a result, the at least one gear element with the at least one highly precise cut edge, in particular at the outer contour and/or inner contour can be produced, or stamped out. Additionally or alternatively, the at least one precision stamped, fine blanked and/or fine stamped gear element has a high cylindrical cut portion along the sheet thickness. These precise cuts, or cut edge, can be advantageous, in particular in the gear elements according to the present subject matter, preferably in the region of the at least one toothing.

Preferably, the at least one ring gear, the output gear, the transmission gear, the transmission pinion, the intermediate pinion, the output gear, the sun gear, the planet carrier and/or the planet gear are/is formed as a stamped part, in particular as a fine stamped part, a fine blanked part and/or a precision stamped part.

BRIEF DESCRIPTION OF THE FIGURES

Further advantages of the invention are described in the following exemplary embodiments, wherein.

In the following description of the figures, the same reference characters are used for features that are identical and/or at least comparable in each of the various figures. The individual features, their embodiment and/or mode of operation are explained in detail usually only upon the first mention thereof. If individual features are not explained in detail once more, their embodiment and/or mode of operation correspond(s) to the embodiment and mode of operation of the above-described features having the same function or the same name.

Figure 1:
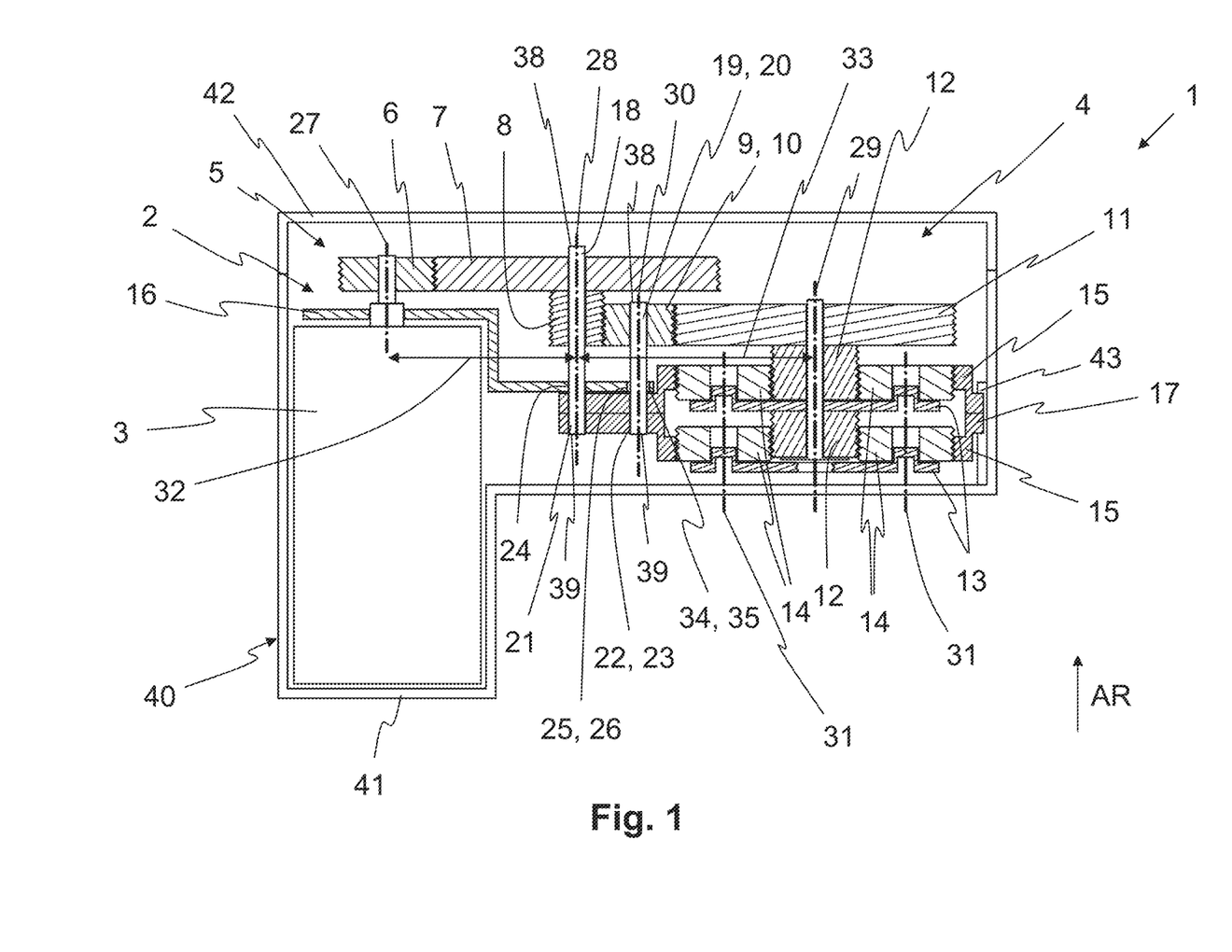
FIG. 1 shows a schematic sectional view of an actuating drive according to one exemplary embodiment.

FIG. 1 shows a schematic sectional view of an actuating drive 1 according to one exemplary embodiment. The actuating drive 1 includes, in the exemplary embodiment shown, a planetary gear unit 4, which is in the form of a multi-stage, in particular two-stage, planetary gear unit 4 by way of example. The planetary gear unit 4 is driven, or set into rotational motion, by means of a motor 3. The rotational motion of the motor 3 is transmitted and/or stepped-up onto the planetary gear unit 4 by means of at least one gear wheel, or spur gear, in the form of gear elements 6, 7, 8, 9, 10, 11, 12, 13, 14, 15. For this purpose, the actuating drive 1 in the exemplary embodiment shown has transmission gearing 5 which is formed from multiple gear elements 6, 7, 8, 9, 10, 11, 12, 13, 14, 15.

The actuating drive 1 has multiple gear elements 6, 7, 8, 9, 10, 11, 12, 13, 14, 15. At least one of the gear elements 6, 7, 8, 9, 10, 11, 12, 13, 14, 15, in particular several of the gear elements 6, 7, 8, 9, 10, 11, 12, 13, 14, 15, has/have a toothing. By means of the toothing, the multiple gear elements 6, 7, 8, 9, 10, 11, 12, 13, 14, 15 are in engagement with one another.

A plurality of gear elements 6, 7, 8, 9, 10, 11, 12, 13, 14, 15 are shown in the exemplary embodiment of FIG. 1. For example, the gear elements 6, 7, 8, 9, 10, 11, 12, 13, 14, 15 include at least one input pinion 6, at least one transmission gear 7, at least one transmission pinion 8, at least one intermediate pinion 9, 10, at least one output gear 11, at least one sun gear 12, at least one planet carrier 13, at least one planet gear 14 and/or at least one ring gear 15. Preferably, the aforementioned gear elements 6, 7, 8, 9, 10, 11, 12, 13, 14, 15 are in engagement with one another, in particular in the aforementioned order. Preferably, the at least one transmission gear 7, the at least one transmission pinion 8 and/or the at least one intermediate pinion 9, 10 form the transmission gearing 5. As a result, the torque, or the rotational motion, introduced by the motor 3 can be transmitted and/or transmitted in a geared manner from an input axis 27 to an output axis 29.

Preferably, the transmission gearing 5 has a first intermediate pinion 9 and a second intermediate pinion 10. As a result, the load that is transmitted from the at least one transmission pinion 8 to the at least one output gear 11 via the two intermediate pinions 9, 10, can be branched and/or split. In this way, the likelihood of failure of the at least one intermediate pinion 9, 10 can be reduced. Only one of the intermediate pinions 9, 10 is shown in the exemplary embodiment of FIG. 1. Preferably, the first intermediate pinion 9 and the second intermediate pinion 10 are arranged one behind the other such that only one of the two intermediate pinions 9, 10 is visible in the exemplary embodiment of FIG. 1.

In addition, the exemplary embodiment of FIG. 1 illustrates the planetary gear unit 4. The planetary gear unit 4 includes the at least one ring gear 15, the at least one planet carrier 13, the at least one planet gear 14, the at least one sun gear 12 and/or the at least one output gear 11. Since the planetary gear unit 4 is in the form of a multi-stage, in particular two-stage, planetary gear unit 4, this includes at least two planet carriers 13, at least two planet gears 14 and at least two sun gears 12. In addition, the planetary gear unit 4 in the exemplary embodiment of FIG. 1 has two ring gears 15.

Preferably, at least one of the gear elements 6, 7, 8, 9, 10, 11, 12, 13, 14, 15, in particular the at least one input pinion 6, the at least one transmission gear 7, the at least one transmission pinion 8, the at least one output gear 11, the at least one sun gear 12, the at least one planet carrier 13, the at least one planet gear 14 and/or the at least one ring gear 15, are/is in the form of a stamped part, in particular a fine stamped part, a fine blanked part and/or a precision stamped part. The gear element(s) 6, 7, 8, 9, 10, 11, 12, 13, 14, 15 in the form of a stamped part is/are stamped out of a metal sheet. The stamping is usually carried out by means of fine stamping, fine blanking and/or precision stamping. For this purpose, for example, a triple-stroke press is used. In this way, gear elements 6, 7, 8, 9, 10, 11, 12, 13, 14, 15 that are as exact and/or torque-resistant as possible can be obtained. In addition, the gear element(s) 6, 7, 8, 9, 10, 11, 12, 13, 14, 15 in the form of a stamped part can be shaped subsequent to the stamping.

In the exemplary embodiment shown in FIG. 1, the at least one ring gear 15, the at least one planet carrier 13, the at least one planet gear 14, the at least one output gear 11 and/or the at least one sun gear 12 are/is in the form, for example, of a stamped part, in particular a fine stamped part, a fine blanked part and/or a precision stamped part. As a result, two ring gears 15 in the form of a stamped part form a ring gear unit for the multi-stage planetary gear unit 4 in the exemplary embodiment shown in FIG. 1.

In addition, the at least one planet carrier 13 in the exemplary embodiment shown in FIG. 1 includes at least one bearing section for the at least one planet gear 14. By means of the at least one bearing section, at least one planet gear 14, preferably multiple (e.g., three or five) planet gears 14, can be accommodated by the at least one planet carrier 13 and/or mounted rotatably about a planet gear axis 31. The at least one planet carrier 13 together with the at least one planet gear 14 forms a planet unit.

Additionally or alternatively, the transmission gearing 5 and/or the planetary gear unit 4 have/has at least one double gear. In the exemplary embodiment shown in FIG. 1, the at least one double gear is formed by the at least one transmission pinion 8 and the at least one transmission gear 7 and/or is formed by the at least one sun gear 12 and the at least one output gear 11. The two gear elements 6, 7, 8, 9, 10, 11, 12, 13, 14, 15 in each case can also be in the form of stamped parts and, subsequent to the stamping and/or forming, are abutted against one another and/or connected to each other.

The at least one ring gear 15 and/or the ring gear unit of the planetary gear unit 4 are/is non-displaceably accommodated in a housing 40 of the actuating drive 1 in the exemplary embodiment shown in FIG. 1. For this purpose, the at least one ring gear 15 and/or the ring gear unit have/has at least one securing section 17. The securing section 17 corresponds with a supporting section 43 of the housing 30 such that they abut one another when the planetary gear unit 4 and/or the actuating drive 1 are used as intended. In this way, the at least one ring gear 15 can be fixed, in particular removably fixed, and/or non-rotatably mounted in the housing 40.

If a rotational motion is then generated, or introduced, by means of the motor 3, the at least one input pinion 6 rotates about the input axis 27, the at least one transmission gear 7 rotates about a transmission axis 28, the at least one transmission pinion 8 rotates about the transmission axis 28, the at least one intermediate pinion 9, 10 rotates about at least one intermediate pinion axis 30, the at least one output gear 11 rotates about the output axis 29 and/or the at least one planet gear 14 rotates about the at least one planet gear axis 31.

As described above, the planetary gear unit 4 in the exemplary embodiment shown in FIG. 1 is in the form of a multi-stage, in particular two-stage, planetary gear unit 4. Therefore, the planetary gear unit 4 includes the at least two planet units, the at least two ring gears 15 and/or the at least one ring gear unit. When the actuating drive 1 is used as intended, the toothing of two planet gears 14 which are spaced apart from one another along an axial direction AR of the actuating drive 1 engage into the toothing of the respective ring gears 15 and/or the ring gear unit. Due to the fact that the toothing of the ring gears 15 and/or of the ring gear unit are spaced apart from one another, or the distance between the toothing is in the form of a cavity, a weight reduction of the planetary gear unit 4 can be achieved.

The actuating drive 1 includes a bearing unit 2 which supports the motor 3 and at least one gear element 6, 7, 8, 9, 10, 11, 12, 13, 14, 15 of the actuating drive 1 when the actuating drive 1 is used as intended. The bearing unit 2 includes at least one fixing element 16 and the at least one ring gear 15. By means of the at least one fixing element 16, the motor 3 can be fixable and/or mountable in the housing 40 of the actuating drive 1. For this purpose, the at least one fixing element 16 can accommodate the motor 3, for example, in the region of the input pinion 6. The at least one ring gear 15 preferably accommodates the at least one gear element 6, 7, 8, 9, 10, 11, 12, 13, 14, 15 of the actuating drive 1. By means of the fixing element 16, the motor 3 can be fixed relative to the transmission gearing 5 and/or relative to the planetary gear unit 4. In this way, the distances of the individual spur gears to each other can be held constant. As a result, the wear on the spur gears can be reduced.

The bearing unit 2 also includes at least one bearing axle 18, 19, 20, and the at least one ring gear 15 and the at least one fixing element 16 are connected, in particular directly connected, via the at least one bearing axle 18, 19, 20 when the bearing unit 2 is used as intended. Preferably, the at least one bearing axle 18, 19, 20 is in the form of an independent bearing pin. Additionally or alternatively, the at least one ring gear 15 and/or the at least one fixing element 16 can include the at least one bearing axle 18, 19, 20. By means of the at least one bearing axle 18, 19, 20, the two ring gears 15 in the form of stamped parts can be additionally or alternatively connected to each other and/or fixed to one another.

Preferably, the at least one ring gear 15 includes the at least one bearing axle 18, 19, 20 and/or at least one receiving cavity 21, 22, 23 for the at least one bearing axle 18, 19, 20. In the exemplary embodiment shown, the at least one ring gear 15 includes the at least one receiving cavity 21, 22, 23, into which the at least one bearing axle 18, 19, 20 is insertable and/or accommodatable. When the bearing unit 2 is used as intended, the at least one bearing axle 18, 19, 20 is accommodated, in particular in a non-displaceable and/or removable manner, in the at least one receiving cavity 21, 22, 23.

Additionally or alternatively, the at least one fixing element 16 preferably includes the at least one bearing axle 18, 19, 20 and/or at least one bearing through-hole 24, 25, 26 for the at least one bearing axle 18, 19, 20. In the exemplary embodiment shown in FIG. 1, the at least one fixing element 16 includes the at least one bearing through-hole 24, 25, 26, through which the at least one bearing axle 18, 19, 20 projects. When the bearing unit 2 is used as intended, the at least one bearing axle 18, 19, 20 is supported in the at least one bearing through-hole 24, 25, 26, in particular transversely to the axial direction AR. In the region of the at least one bearing axle 18, 19, 20, the at least one ring gear 15 and the at least one fixing element 16 abut one another preferably along the axial direction AR. In addition, the at least one bearing axle 18, 19, 20 can be delimited and/or secured, for example, by the housing 40, in particular along the axial direction AR, so that these do not unintentionally become separated from one another when the actuating drive 1 is used as intended.

By means of the at least one bearing axle 18, 19, 20, the at least one gear element 6, 7, 8, 9, 10, 11, 12, 13, 14, 15, in particular the at least one transmission gear 7, the at least one transmission pinion 8 and/or the at least one intermediate pinion 9, 10, can be accommodated and/or supported. In the exemplary embodiment shown in FIG. 1, a first bearing axle 18 accommodates the at least one transmission gear 7 and/or the at least one transmission pinion 8. Additionally or alternatively, a second bearing axle 19 accommodates the at least one first intermediate pinion 9 and/or a third bearing axle 20 accommodates the at least one second intermediate pinion 10.

Preferably, the first bearing axle 18, the second bearing axle 19 and/or the third bearing axle 20 are/is connected, in particular in a non-displaceable manner, to the at least one ring gear 15, preferably to the two ring gears 15. In this way, the at least one ring gear 15, preferably the two ring gears 15, include(s) a first receiving cavity 21 for the first bearing axle 18, a second receiving cavity 22 for the second bearing axle 19 and/or a third receiving cavity 23 for the third bearing axle 20. Additionally or alternatively, the at least one fixing element 16 includes a first bearing through-hole 24 for the first bearing axle 18, a second bearing through-hole 25 for the second bearing axle 19 and/or a third bearing through-hole 26 for the third bearing axle 20. In this way, the at least one ring gear 15 and the at least one fixing element 16 can be connected to each other via at least three bearing axles 18, 19, 20.

Preferably, the first bearing through-hole 24 together with the first bearing axle 18 forms an interference fit and/or a transition fit. In this way, the first bearing through-hole 24 rests circumferentially against the first bearing axle 18. As a result, when the bearing unit 2 is used as intended, a first center distance 32 between the input axis 27 and the transmission axis 28 and/or a second center distance 33 between the transmission axis 28 and the output axis 29 can be constant and/or invariable.

Preferably at least one compensating play or tolerance 34, 35 is formed, or arranged, between at least one of the bearing through-holes 24, 25, 26 and the at least one bearing axle 18, 19, 20. As a result, when the actuating drive 1 is used as intended, the at least one fixing element 16 can move, in particular in a limited manner, relative to the at least one ring gear 15. The at least one compensating play or tolerance 34, 35 can be in the form, for example, of a compensating element and/or, as shown in the exemplary embodiment of FIG. 1, as a clearance. The at least one bearing axle 18, 19, 20 can move within the compensating play or tolerance 34, 35, which is in the form, in particular, of clearance.

The at least one bearing axle 18, 19, 20 preferably has at least two ends in each case, namely a first end 38 and a second end 39. The first end 38 is directed toward a housing cover 42 of the housing 40 when the actuating drive 1 is used as intended. The second end 39 is directed toward a housing bottom part 41 of the housing 40 when the actuating drive 1 is used as intended. Preferably, the second end 39 of the at least one bearing axle 18, 19, 20 is arranged within the at least one receiving cavity 21, 22, 23 and/or the at least one ring gear 15 projects above the at least one bearing axle 18, 19, 20 at least in part counter to the axial direction. The first end 38, however, is preferably arranged within the at least one gear element 6, 7, 8, 9, 10, 11, 12, 13, 14, 15 and/or the at least one gear element 6, 7, 8, 9, 10, 11, 12, 13, 14, 15 projects above the at least one bearing axle 18, 19, 20 at least in part along the axial direction AR.

Preferably, the at least one bearing axle 18, 19, 20, preferably the first bearing axle 18, the second bearing axle 19 and/or the third bearing axle 20, are/is spaced apart from the at least one housing 40 of the actuating drive 1, in particular along the axial direction AR. In this way, the at least one bearing axle 18, 19, 20, preferably the first bearing axle 18, the second bearing axle 19 and/or the third bearing axle 20, are/is supported, merely at one end, in particular exclusively in the bearing unit 2 and/or by means of the bearing unit 2. In this way, interlinking of tolerances by the housing 40 can be avoided.

Figure 2:
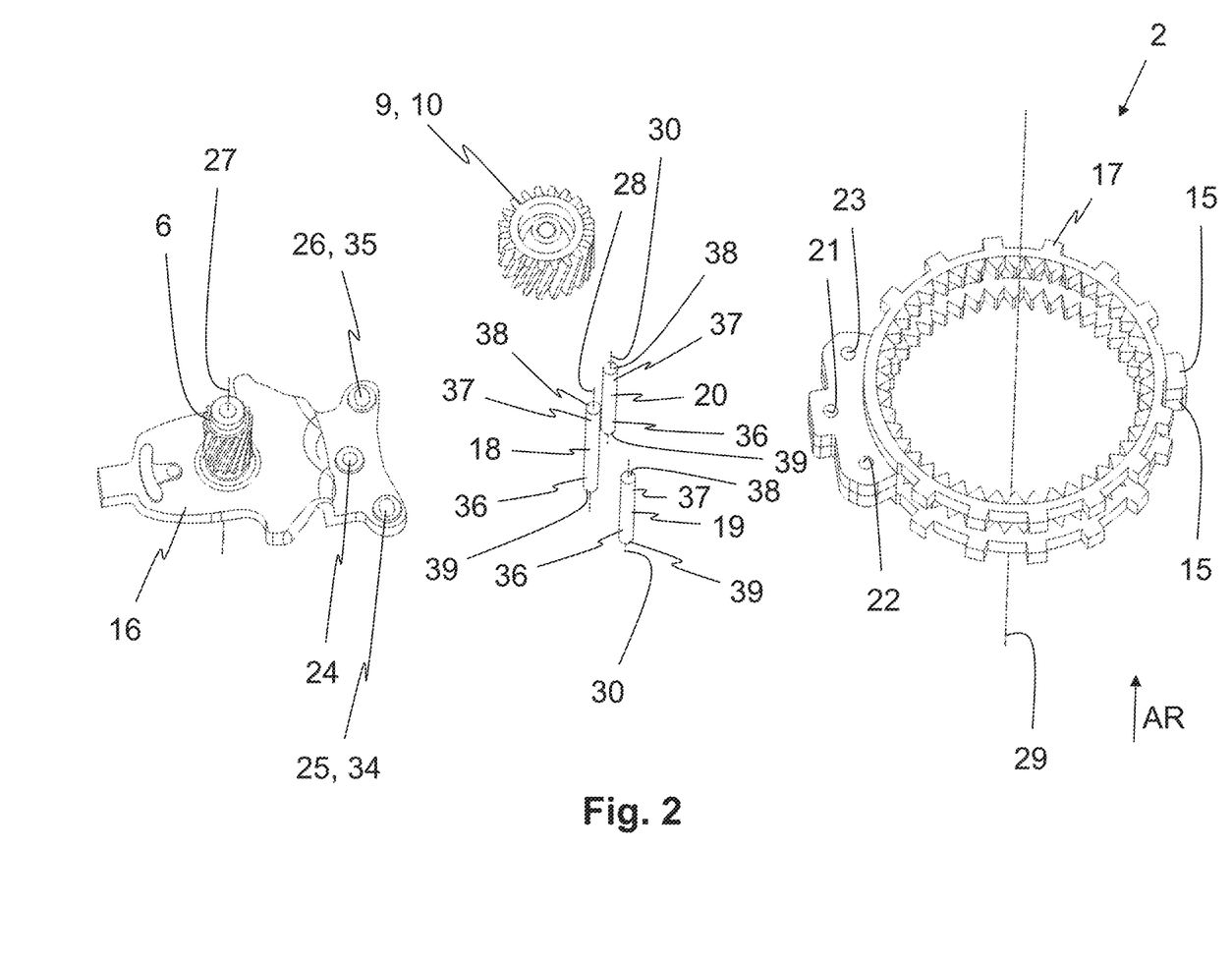
FIG. 2 shows a schematic perspective of a bearing unit according to one exemplary embodiment.

FIG. 2 shows a schematic perspective of a bearing unit 2 according to one exemplary embodiment. The bearing unit 2 is shown as an exploded drawing, so that the individual components, or elements, are more visible. The at least one fixing element 16, the at least one bearing axle 18, 19, 20 and/or the at least one ring gear 15 are shown spaced apart from one another. In addition, the at least one intermediate pinion 9, 10 is shown by way of example in the exemplary embodiment in FIG. 2. The bearing unit 2 is designed similarly to the bearing unit 2 in the actuating drive 1 in FIG. 1.

As is apparent in the exemplary embodiment in FIG. 2, the third bearing through-hole 26 and/or the second bearing through-hole 25 are/is in the form of an elongate through-hole. Due to this design, a first compensating play or tolerance 34 can be formed, for example, between the second bearing through-hole 25 and the second bearing axle 19, and/or a second compensating play or tolerance 35 can be formed between the third bearing through-hole 26 and the third bearing axle 20. Due to this elongate through-hole, the clearance for moving the at least one fixing element 16 relative to the at least one ring gear 15 can therefore be ensured. The two compensating plays or tolerance 34, 35 are shown highly overdrawn in FIG. 1, however. It is also possible, however, that the at least one compensating play or tolerance 34, 35 is alternatively designed as a clearance fit and/or transition fit of the at least one bearing axle 18, 19, 20 relative to the at least one bearing through-hole 24, 25, 26. Additionally or alternatively, the at least one compensating play or tolerance 34, 35 can be a compensating element. If the second bearing through-hole 25 and/or the third bearing through-hole 26 have/has the at least one compensating play or tolerance 34, 35, when the actuating drive 1 is used as intended, the at least one fixing element 16 can be pivoted in a limited manner relative to the at least one ring gear 15, in particular about the first bearing axle 18 and/or about the transmission axis 28.

The section of the at least one bearing axle 18, 19, 20 which, when the bearing unit 2 is used as intended, is accommodatable within the at least one receiving cavity 21, 22, 23 of the at least one ring gear 15 and/or projects through the at least one bearing through-hole 24, 25, 26, can also be referred to as a receiving section 36. The section of the at least one bearing axle 18, 19, 20 which accommodates the at least one gear element 6, 7, 8, 9, 10, 11, 12, 13, 14, 15, in particular the at least one transmission gear 7, the at least one transmission pinion 8 and/or the at least one intermediate pinion 9, 10 when the bearing unit 2 is used as intended can be also be referred to as a bearing section 37. Additionally or alternatively, the at least one bearing section 37 can extend from the region at which it is supported by the at least one bearing through-hole 24, 25, 26 to the first end 38 of the at least one bearing axle 18, 19, 20.

The bearing section 37 preferably adjoins the first end 38 and/or the receiving section 36 adjoins the second end 39 of the at least one bearing axle 18, 19, 20. In this way, the receiving section 36 extends over at least one-third, preferably at least one-half, of an overall length of the bearing axle 18, 19, 20 extending along the axial direction AR. Additionally or alternatively, the receiving section 36 extends together with the bearing section 37 over at least one-half, preferably at least two-thirds, of the overall length of the bearing axle 18, 19, 20 extending along the axial direction AR.

LIST OF REFERENCE CHARACTERS 1 actuating drive
2 bearing unit
3 motor
4 planetary gear unit
5 transmission gearing
6 input pinion
7 transmission gear
8 transmission pinion
9 first intermediate pinion
10 second intermediate pinion
11 output gear
12 sun gear
13 planet carrier
14 planet gear
15 ring gear
16 fixing element
17 securing section
18 first bearing axis
19 second bearing axis
20 third bearing axis
21 first receiving cavity
22 second receiving cavity
23 third receiving cavity
24 first bearing through-hole
25 second bearing through-hole
26 third bearing through-hole
27 input axis
28 transmission axis
29 output axis
30 intermediate pinion axis
31 planet gear axis
32 first center distance
33 second center distance
34 first compensating play
35 second compensating play 36 receiving section
37 bearing section
38 first end
39 second end
40 housing
41 housing bottom section
42 housing cover
43 supporting section
AR axial direction

The invention claimed is:

1. A bearing unit for a motor and at least one gear element of an actuating drive, the bearing unit comprising:
   at least one fixing element with which the motor is fixable and/or mountable in a housing of the actuating drive;
   at least one ring gear including at least one securing section, the at least one ring gear being fixable and/or non-rotatably mountable in the housing via the at least one securing section; and
   at least one bearing axle, the at least one bearing axle connecting the at least one ring gear and the at least one fixing element, wherein the at least one bearing axle comprises a first bearing axle, a second bearing axle, and a third bearing axle, the first bearing axle being configured to support and/or accommodate at least one transmission gear and/or at least one transmission pinion of the at least one gear element, the second bearing axle being configured to support and/or accommodate at least a first intermediate pinion of the at least one gear element, the third bearing axle being configured to support and/or accommodate at least a second intermediate pinion of the at least one gear element.

2. The bearing unit of claim 1, wherein:
   the at least one ring gear defines least one receiving cavity for receiving the at least one bearing axle; and
   the at least one fixing element defines at least one bearing through-hole for the at least one bearing axle.

3. The bearing unit of claim 2, wherein the at least one bearing axle is received in the at least one receiving cavity of the at least one ring gear in a non-displaceable manner and/or is supported in the at least one bearing through-hole in the at least one fixing element.

4. The bearing unit of claim 1, wherein the at least one bearing axle supports the at least one gear element of the actuating drive, the at least one bearing axle extending along an axial direction of the actuating drive.

5. The bearing unit of claim 1, wherein the at least one ring gear defines a first receiving cavity for receiving the first bearing axle, a second receiving cavity for receiving the second bearing axle, a third receiving cavity for receiving the third bearing axle and wherein the at least one fixing element defines a first bearing through-hole for receiving the first bearing axle, a second bearing through-hole for receiving the second bearing axle, and a third bearing through-hole for receiving the third bearing axle.

6. The bearing unit of claim 5, wherein the first bearing through-hole together with the first bearing axle forms an interference fit so that at least one of a first center distance between an input axis of the motor and a transmission axis extending through the first bearing axle or a second center distance between the transmission axis and an output axis of a planetary gear unit of the actuating drive is constant and/or invariable.

7. The bearing unit of claim 5, wherein at least one compensating tolerance is formed between at least one of the first bearing through-hole, the second bearing through-hole, or the third bearing through-hole and a corresponding one of the first bearing axle, the second bearing axle, and the third bearing axle, respectively, so that the at least one fixing element is movable relative to the at least one ring gear.

8. The bearing unit of claim 7, wherein the at least one compensating tolerance includes a first compensating tolerance and a second compensating tolerance, the first compensating tolerance being formed between the second bearing through-hole and the second bearing axle and the second compensating tolerance being formed between the third bearing through-hole and the third bearing axle so that the at least one fixing element is pivotable relative to the at least one ring gear about the first bearing axle.

9. The bearing unit of claim 1, wherein the at least one bearing axle includes a receiving section and a bearing section, the receiving section being supported and/or accommodated at least in part in a receiving cavity defined by the at least one ring gear and/or in a bearing through-hole defined by the at least one fixing element, the bearing section being configured to support or accommodate the at least one gear element of the actuating drive.

10. The bearing unit of claim 9, wherein the receiving section extends over at least one-third of an overall length of the at least one bearing axle along an axial direction of the actuating drive.

11. The bearing unit of claim 9, wherein the receiving section extends together with the bearing section over at least one-half of an overall length of the at least one bearing axle along an axial direction of the actuating drive.

12. The bearing unit of claim 9, wherein the at least one bearing axle has a first end and a second end, the first end being adjacent to the bearing section and the second end being adjacent to the receiving section.

13. The bearing unit of claim 12, wherein:
   the at least one ring gear defines least one receiving cavity for receiving the at least one bearing axle, the second end of the at least one bearing being arranged within the at least one receiving cavity; and/or
   the at least one ring gear projects at least in part above the at least one bearing axle counter to an axial direction of the actuating drive.

14. An actuating drive for a vehicle component, the actuating drive comprising:
   at least one housing;
   a motor arranged in the at least one housing;
   a planetary gear unit and/or transmission gearing arranged in the at least one housing and coupled to the motor; and
   at least one bearing unit for the motor and at least one gear element of the planetary gear unit and/or the transmission gearing, the at least one bearing unit comprising:
      at least one fixing element with which the motor is fixable and/or mountable in the at least one housing;
      at least one ring gear including at least one securing section, the at least one ring gear being fixable and/or non-rotatably mountable in the at least one housing via the at least one securing section; and
      at least one bearing axle, the at least one bearing axle connecting the at least one ring gear and the at least one fixing element,
      wherein the at least one fixing element defines at least one bearing through-hole for the at least one bearing axle, and
      wherein a space is formed between at least one of the bearing through-holes and at least one of the bearing axles so that the at least one fixing element is movable with respect to the at least one ring gear when the actuating drive is in use.

15. The actuating drive of claim 14, wherein a first end and/or a second end of the at least one bearing axle is spaced apart from the at least one housing.

16. The actuating drive of claim 14, wherein the at least one gear element and/or the at least one ring gear are/is in the form of a stamped part.

17. A bearing unit for a motor and at least one gear element of an actuating drive, the bearing unit comprising:
   at least one fixing element with which the motor is fixable and/or mountable in a housing of the actuating drive;
   at least one ring gear including at least one securing section, the at least one ring gear being fixable and/or non-rotatably mountable in the housing via the at least one securing section; and
   at least one bearing axle, the at least one bearing axle connecting the at least one ring gear and the at least one fixing element,
   wherein the at least one fixing element defines at least one bearing through-hole for the at least one bearing axle, and
wherein a space is formed between at least one of the bearing through-holes and at least one of the bearing axles so that the at least one fixing element is movable with respect to the at least one ring gear when the actuating drive is in use.

18. An actuating drive for a vehicle component, the actuating drive comprising:
   at least one housing;
   a motor arranged in the at least one housing;
   a planetary gear unit and/or transmission gearing arranged in the at least one housing and coupled to the motor; and
   at least one bearing unit for the motor and at least one gear element of the planetary gear unit and/or the transmission gearing, the at least one bearing unit comprising:
      at least one fixing element with which the motor is fixable and/or mountable in the at least one housing;
      at least one ring gear including at least one securing section, the at least one ring gear being fixable and/or non-rotatably mountable in the at least one housing via the at least one securing section; and
      at least one bearing axle, the at least one bearing axle connecting the at least one ring gear and the at least one fixing element, wherein the at least one bearing axle comprises a first bearing axle, a second bearing axle, and a third bearing axle, the first bearing axle being configured to support and/or accommodate at least one transmission gear and/or at least one transmission pinion of the at least one gear element, the second bearing axle being configured to support and/or accommodate at least a first intermediate pinion of the at least one gear element, the third bearing axle being configured to support and/or accommodate at least a second intermediate pinion of the at least one gear element.

* * * * *